(No Model.) 2 Sheets—Sheet 2.
N. M. MILLER.
FACE PLATE FOR GLASS MACHINES.
No. 531,733. Patented Jan. 1, 1895.
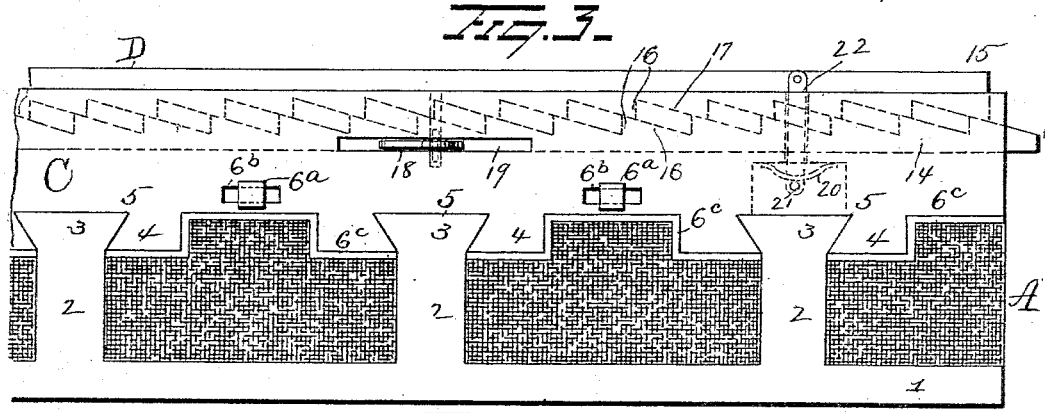
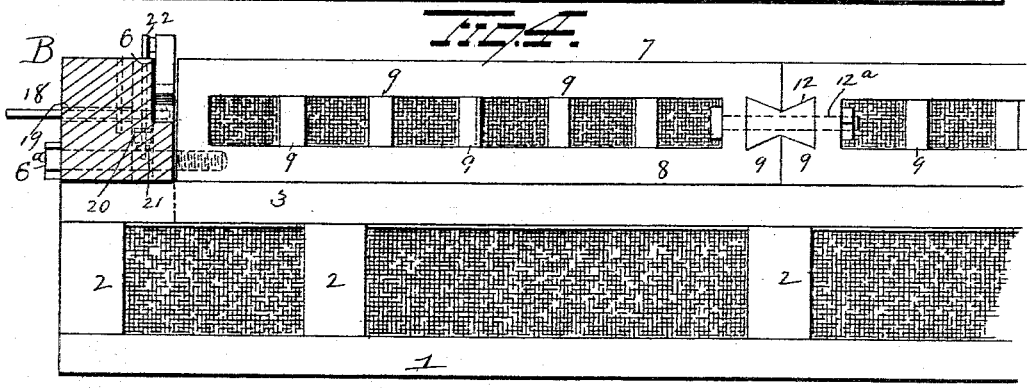
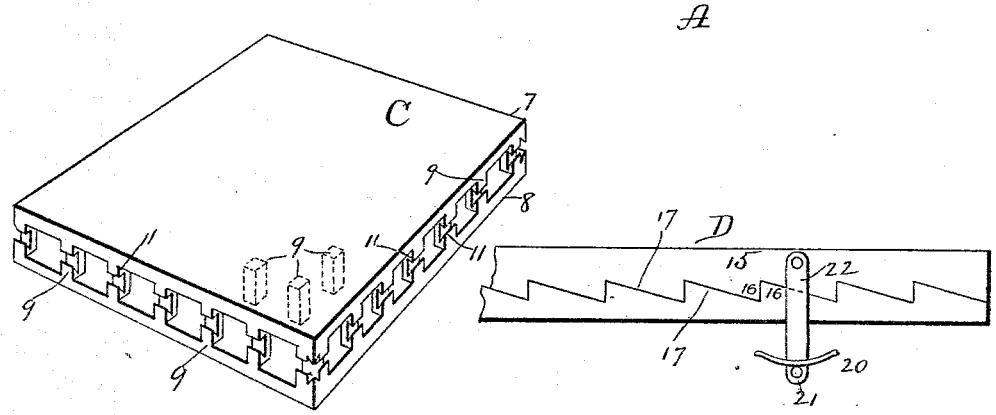
Witnesses
C. I. Willingham
G. F. Downing
Inventor
N. M. Miller
By Leggett and Leggett
Attorneys

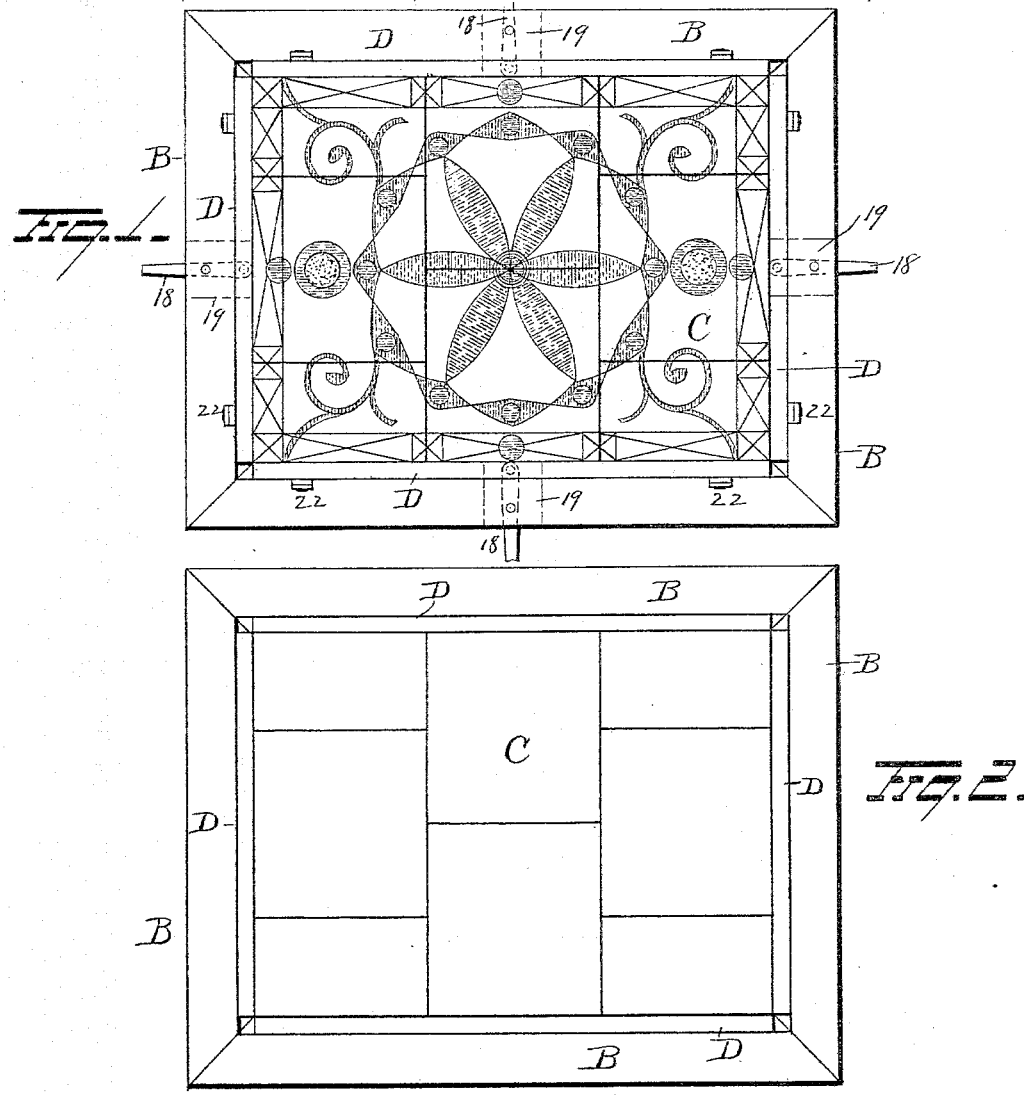

UNITED STATES PATENT OFFICE.

NILES M. MILLER, OF PHILADELPHIA, PENNSYLVANIA.

FACE-PLATE FOR GLASS-MACHINES.

SPECIFICATION forming part of Letters Patent No. 531,733, dated January 1, 1895.

Application filed November 29, 1893. Serial No. 492,383. (No model.)

*To all whom it may concern:*

Be it known that I, NILES M. MILLER, a citizen of the United States, residing at Philadelphia, in the county of Philadelphia and State of Pennsylvania, have invented certain new and useful Improvements in Face-Plates for Glass-Machines; and I do hereby declare the following to be a full, clear, and exact description of the invention, such as will enable others skilled in the art to which it appertains to make and use the same.

My invention relates to an improvement in face plates for glass machines,—the object of the invention being to so construct a face plate that it can be employed either for producing a plain or a figured surface on the glass.

A further object is to produce a simple and efficient removable and reversible face plate for a glass machine.

A further object is to produce simple and efficient means for regulating the thickness of the glass plate to be produced.

A further object is to produce simple and efficient means for securing the sections of a face plate together and for securing the face plate as a whole to the table.

With these objects in view the invention consists in certain novel features of construction and combinations and arrangements of parts as hereinafter set forth and pointed out in the claims.

In the accompanying drawings: Figure 1 is a plan view of my improved sectional figured face plate. Fig. 2 is a similar view showing the reverse or plain side of the face plate. Fig. 3 is an edge view of a portion of the device, showing the connection of the face plate to the table. Fig. 4 is a sectional view showing the manner of connecting the face plate to the frame and of connecting the sections of the face plate together. Fig. 5 is a perspective view of one of the sections of the face plate. Fig. 6 is a view illustrating the guides.

A represents the table of a glass machine comprising a base 1 and a series of cross bars 2 having dove-tailed upper ends 3. A frame comprising a series of bars B is located at the edges of the table. Each bar B is provided on its under side with a series of ribs 4, each having a dove-tailed groove 5 for the reception of the dove-tailed upper ends 3 of the bars 2. Each bar B is also made at its inner side with a recess or groove 6 for a purpose hereinafter explained, and located on the bars 2, within the bars B, is my improved face plate C. The face plate is secured to the bars B by means of bolts $6^a$ passing through elongated slots or perforations $6^b$ in the bars B and into said face plate. By connecting the bars B to the table and mounting the face plate as above explained, the expansion and contraction of the parts will be compensated for. The space in the table below the face plate can be filled with any suitable heat retaining material which latter may be retained in place by means of thin plates $6^c$.

The face plate C is composed of a series of sections, and each section is composed of two plates 7 8, spaced apart and connected together by means of a number of posts 9. In the space between the two plates 7, 8, heat retaining material will be placed. By thus constructing the sections of the face plate, they will be much lighter than if a single solid plate were used, and the expansion and contraction will be less. One surface of each section of the face plate will be smooth and the other surface may be figured, or both surfaces may be figured or smooth. When the several sections of the face plate are placed together with their smooth surfaces up, the face plate will be adapted for producing a smooth surface on the glass, but when it is desired to produce a figured surface on the glass, the face plate will be reversed so that its figured surface will be uppermost, the several sections, when placed together producing the desired design. The figured surface of the face plate may be produced in any suitable manner. The figures on the surface of the face plate may be raised so as to produce a depressed design or figure in the glass, or a depressed figure may be made in the face plate so as to produce a raised figure on the glass.

The posts 9 at the edges of the face plate are made with dove-tailed recesses 11 for the reception of double dove-tailed keys 12, whereby to unite said sections to produce a complete face plate. The sections of the face plate are further secured together by means of bolts $12^a$.

In order to retain the molten glass in place on the face plate and to regulate the thickness of the plate to be produced, guides D are inserted in the grooves or recesses 6 in the bars B, said guides thus being disposed at the edges of the face plate. Each guide D comprises a bar 14 and a bar 15 provided with intermeshing teeth 16 having inclined faces 17. A lever 18 projects through an elongated slot 19 in each bar B. Each lever 18 is pivoted at a point between its ends and at its inner end is pivotally connected to the under bar 14 of one of the guides. By moving the lever 18 in one direction, the bar 14 will be moved longitudinally in one direction, and the inclined faces on said bar will act on the inclined faces of the bar 15 and the top of the latter will be thus caused to be raised above the top of the face plate to any desired extent according to the thickness it is desired to make the sheet of glass, the relative position of the top of the guide to the top of the face plate being of course regulated by the extent of movement of the lever 18. By moving the lever 18 in the reverse direction the upper bar of the guide can be permitted to descend, being caused to descend when the lever is given this reverse movement by means of a spring 20 acting on the head 21 of a pin 22 connected to the upper bar of the guide.

Having fully described my invention, what I claim as new, and desire to secure by Letters Patent, is—

1. A reversible face plate for a glass machine, having a plain surface on one side and a figured surface on the other side, substantially as set forth.

2. A reversible face plate for glass machines, made in sections, substantially as set forth.

3. A reversible face plate having a plain and a figured surface, said face plate being made in sections and the sections secured together to produce a completed figure or design, substantially as set forth.

4. A face plate for a glass machine made in sections, each section comprising two plates spaced apart, substantially as set forth.

5. A face plate for a glass machine, comprising two plates, posts for separating said plates and heat retaining material between said plates, substantially as set forth.

6. The combination with a face plate for a glass machine, of a frame surrounding said face plate, and a depressible guide carried by said frame, substantially as set forth.

7. The combination with a series of bars having dove-tailed upper ends, of a series of bars constituting a frame, having dove-tail grooves to receive said dove-tail upper ends of said first-mentioned bars, a face plate mounted within said frame and means for securing said frame and face plate together, substantially as set forth.

8. The combination with a face plate and a frame surrounding the same and having grooves therein, of adjustable guides located in said grooves, substantially as set forth.

9. The combination with a face plate, of guides surrounding the same, each guide comprising two bars having intermeshing teeth having inclined faces, and a pivoted lever connected to one of said bars, substantially as set forth.

10. The combination with a face plate, of guides surrounding the same, each guide comprising two bars having intermeshing teeth having inclined faces, a pivoted lever connected to one of said bars, and a spring for returning said bars to their normal positions, substantially as set forth.

11. The combination with a face made in sections, each section comprising two plates spaced apart by posts, said posts being made with dove-tailed recesses at the edges of the sections, of a double dove-tail key adapted to enter said dove tail recesses to unite two sections of said face plate, substantially as set forth.

12. The combination with a base and series of bars constituting a table, of a face plate located on said bars so as to leave a space between the face plate and base of the table for the reception of heat retaining material, and a covering under the face plate for said heat retaining material, substantially as set forth.

In testimony whereof I have signed this specification in the presence of two subscribing witnesses.

NILES M. MILLER.

Witnesses:
R. S. FERGUSON,
C. S. DRURY.